United States Patent [19]

Nagahama et al.

[11] 3,725,490
[45] Apr. 3, 1973

[54] PROCESS FOR SEPARATING DIMETHYL NAPHTHALENES COMPRISING 2,6-DIMETHYL NAPHTHALENE AS MAIN COMPONENT

[75] Inventors: Shizuo Nagahama; Keizo Shimada; Seizi Kurozumi, all of Tokyo, Japan

[73] Assignee: Teijin Limited, Osaka, Japan

[22] Filed: Mar. 30, 1971

[21] Appl. No.: 129,621

[30] Foreign Application Priority Data

| Dec. 22, 1970 | Japan | 45/116410 |
| Mar. 30, 1970 | Japan | 45/26748 |
| Mar. 31, 1970 | Japan | 45/27301 |
| Mar. 31, 1970 | Japan | 45/27302 |
| Apr. 1, 1970 | Japan | 45/27697 |
| Oct. 3, 1970 | Japan | 45/96047 |
| Nov. 12, 1970 | Japan | 45/99074 |

[52] U.S. Cl. ............................................. 260/674 N
[51] Int. Cl. ............................................. C07c 7/02
[58] Field of Search ............................... 260/674 N

[56] References Cited

UNITED STATES PATENTS

| 3,665,044 | 5/1972 | Scott | 260/674 |
| 2,914,581 | 11/1959 | Christensen et al. | 260/674 |
| 2,941,017 | 6/1960 | Veatch et al. | 260/674 |
| 2,941,019 | 6/1960 | Foreman et al. | 260/674 |

*Primary Examiner*—Delbert E. Gantz
*Assistant Examiner*—C. E. Spresser
*Attorney*—Sherman & Shalloway

[57] ABSTRACT

A process for separating dimethyl naphthalenes the main component of which is 2,6-dimethyl naphthalene in the form of their complexes with m-nitrobenzoic acid, which comprises contacting a dimethyl naphthalene isomer mixture comprising at least 2,6-dimethyl naphthalene or a hydrocarbon mixture containing such dimethyl naphthalene isomer mixture with m-nitrobenzoic acid, to thereby form a mixture of complexes of the dimethyl naphthalenes with m-nitrobenzoic acid the main component of which is a complex of 2,6-dimethyl naphthalene with m-nitrobenzoic acid, and separating the complexes in the solid state from the reaction mixture.

10 Claims, No Drawings

PROCESS FOR SEPARATING DIMETHYL NAPHTHALENES COMPRISING 2,6-DIMETHYL NAPHTHALENE AS MAIN COMPONENT

This invention relates to a process for separating dimethyl naphthalenes comprising 2,6-dimethyl naphthalene as a main component in the form of their complexes with m-nitrobenzoic acid, which comprises contacting a mixture of isomers of dimethyl naphthalene (abbreviated as "DMN" hereinbelow) containing at least 2,6-dimethyl naphthalene (abbreviated as "2,6-DMN" hereinbelow) or a hydrocarbon mixture containing such isomeric mixture with m-nitrobenzoic acid.

2,6-DMN can be converted to naphthalene-2,6-dicarboxylic acid by oxidation, and the resulting naphthalene-2,6-dicarboxylic acid is useful as the starting material for the preparation of polyesters and plasticizers.

Also other DMN isomers can be converted to naphthalene-2,6-dicarboxylic acid by oxidizing them and then subjecting the oxidized products to the so-called Henkel rearrangement reaction.

Accordingly, various proposals have been made to separate DMN mixtures comprising 2,6-DMN in the highly concentrated state from a mixture of DMN isomers comprising 2,6-DMN or a hydrocarbon mixture containing such mixture of DMN isomers.

For instance, a DMN mixture comprising 2,6-DMN and 2,7-DMN as main components can be obtained by cooling a DMN-containing fraction concentrated and extracted from a petroleum or coal tar starting material by a suitable method. The resulting DMN mixture is recrystallized from a suitable solvent. This recrystallizing method is disclosed in, for instance, the U.S. Pat. No. 3,249,644. In U.S. Pat. No. 3,485,885 and U.S. Pat. No. 3,400,548 a partially melting process is proposed comprising melt-separating low melting point components of the above DMN mixture or a low melting point eutectic mixture, from such DMN mixture derived from a petroleum or coal tar starting material. By adopting these methods or a combination of these methods, 2,6-DMN can be separated but the yield of 2,6-DMN is very low.

2,6-DMN and 2,7-DMN form a eutectic mixture at a molar ratio of 41.5:58.5, and 2,6-DMN and 2,3-DMN form a eutectic mixture at a molar ratio of 47.5:52.5. Accordingly, if the starting DMN mixture contains 2,7-DMN or 2,3-DMN as well as 2,6-DMN, a eutectic mixture of 2,6-DMN with 2,7- or 2,3-DMN is formed and it is impossible to separate 2,6-DMN from the starting mixture in which such eutectic mixture has been formed, by the above recrystallizing or partially melting method. In an ordinary starting mixture, for instance, 2,6-DMN is contained at a content of about 11 – 12 percent by weight, and 2,7-DMN is contained at a similar content. In such starting mixture, about 4/6 mole of 2,6-DMN per mole of 2,7-DMN forms a eutectic mixture with 2,7-DMN present in the starting mixture. Accordingly, the 2,6-DMN which can be actually separated is at most 30 percent or less of the entire 2,6-DMN present in the starting mixture, and although it is possible to increase the content of 2,6-DMN by fractional rectification up to about 30 percent, since the boiling point of 2,7-DMN is very close to the boiling point of 2,6-DMN it is impossible to change the proportions of 2,6-DMN and 2,7-DMN greatly. Therefore, the yield of pure 2,6-DMN cannot be increased by the above recrystallizing or partially melting method.

Accordingly, the primary object of this invention is to provide a process by which a DMN mixture containing 2,6-DMN at a very high concentration can be separated in high yield from a mixture of isomers of DMN.

Another object of this invention is to provide a process by which a DMN mixture containing 2,6-DMN at a very high concentration can be separated in high yield from a hydrocarbon mixture comprising 2,6-DMN and one or more other DMN isomers.

Still another object of this invention is to provide a process for the preparation of a complex of 2,6-DMN with m-nitrobenzoic acid and a process for the purification of such complex.

Still another object of this invention is to provide a novel process for decomposing a complex of 2,6-DMN with m-nitrobenzoic acid.

Other objects and advantages of this invention will be apparent from the description given hereinbelow.

In accordance with this invention, a process is provided for separating DMN the main component of which is 2,6-DMN in the form of their complexes with m-nitrobenzoic acid, which comprises contacting a DMN isomer mixture comprising at least 2,6-DMN or a hydrocarbon mixture containing such DMN isomer mixture with m-nitrobenzoic acid, to thereby form a mixture of complexes of the DMN with m-nitrobenzoic acid the main component of which is a complex of 2,6-DMN with m-nitrobenzoic acid, and separating the complexes in the solid state from the reaction mixture.

An idea was conceived of using a compound capable of forming a complex with DMN in separating a mixture of isomers of DMN from a hydrocarbon mixture containing such DMN isomer mixture, and various compounds were examined with respect to the capability of forming a complex with DMN. Compounds such as picric acid, trinitrotoluene and trinitrobenzene may form complexes with DMN, but it was found that no selectivity among isomers of DMN was observed in the complex-forming capability of these compounds. It was also found that o-cyanobenzoic acid, m-cyanobenzoic acid, p-cyanobenzoic acid, o-nitrobenzoic acid, p-nitrobenzoic acid and methyl esters of these acids do not form a solid separable complex with any of the DMN isomers. Surprisingly, it has now been found that m-nitrobenzoic acid which has a structure similar to that of the above-mentioned compounds has a capability of forming complexes selectively with 2,6-DMN and 2,7-DMN among DMN isomers, especially with 2,6-DMN, and that by utilizing such peculiar property of m-nitrobenzoic acid it is possible to selectively separate 2,6- and 2,7-DMN, especially 2,6-DMN from a mixture of DMN isomers or a hydrocarbon mixture containing such isomeric mixture.

In general, mixtures of DMN isomers and hydrocarbon mixtures comprising such isomeric mixture are liquid at room temperature. When these mixtures are allowed to contact m-nitrobenzoic acid in accordance with this invention, m-nitrobenzoic acid forms solid complexes selectively with 2,6- and 2,7-DMN, especially with 2,6-DMN. The resulting solid complex can be separated easily from the liquid mixture by a known liquid-solid separation technique such as filtration and centrifugal separation.

This invention will now be detailed.

STARTING MATERIAL

In this invention any DMN isomer mixture comprising at least 2,6-DMN as the starting material may be used. In this invention, hydrocarbon mixtures containing a DMN isomer mixture comprising at least 2,6-DMN may also be used. For instance, a fraction of 250°–270°C. obtained from coal tar comprises about 7 – 10 percent by weight of 2,6-DMN, about 7 – 10 percent by weight of 2,7-DMN, 45 – 55 percent by weight of other DMN isomers, and various aromatic compounds such as biphenyl, monomethyl naphthalene, and monoethyl naphthalene. Further, an aromatic fraction of 250° – 270°C. extracted from the reaction product obtained by the thermal cracking of a petroleum fraction of 200° – 300°C. comprises about 10 – 13 percent of 2,6-DMN, about 10 – 13 percent of 2,7-DMN, about 50 – 60 percent of other DMN isomers, and about 10 – 20 percent of other aromatic compounds. In addition, various mixtures of DMN isomers comprising 2,6-DMN are contained in bottom oils of petroleum reformers.

In this invention, any aliphatic, alicyclic or aromatic hydrocarbon mixture containing a mixture of DMN isomers comprising at least 2,6-DMN, such as those mentioned above may be used. However, when the starting material mixture contains naphthalene derivatives substituted by 3 or more methyl groups, such as trimethyl naphthalenes and tetramethyl naphthalenes, since these naphthalene derivatives also form solid complexes with m-nitrobenzoic acid, it is necessary to separate these complexes of such naphthalene derivatives after the treatment with m-nitrobenzoic acid. Although such separation is possible, the amount of m-nitrobenzoic acid used must be increased by the amount used for formation of complexes with such naphthalene derivatives and an additional step of separating these unintended complexes must be conducted. Therefore, it is preferred that the starting material mixture does not contain such naphthalene derivatives.

Even if the starting material to be used in this invention contains small amounts, for instance, less than about 10 percent, of a nitrogen-containing compound such as quinoline and indol and a sulfur-containing compound such as thionaphthene, no particular disadvantage is brought about.

In this invention it is preferable to use as the starting material mixture a hydrocarbon fraction boiling below 275°C., especially at 250° – 270°C., because such fraction is free of naphthalene derivatives containing 3 or more methyl groups and it contains a mixture of DMN isomers at a relatively high ratio. However, this invention is not at all limited to the use of such hydrocarbon fraction.

FORMATION OF COMPLEX AND SEPARATION THEREOF

In this invention, the complex-forming reaction is allowed to proceed by contacting the above-mentioned mixture of DMN isomers comprising at least 2.6-DMN or hydrocarbon mixture containing such isomeric mixture, in the liquid state with m-nitrobenzoic acid.

The critical condition for advancing the complex-forming reaction is that the DMN isomer mixture or the hydrocarbon mixture containing such DMN isomer mixture is contacted with m-nitrobenzoic acid in a manner such that the isomeric mixture or hydrocarbon mixture will be kept in the liquid state during the contact. Accordingly, when the starting mixture is solid at room temperature, it may be heated to melt it, or an aliphatic, alicyclic or aromatic hydrocarbon having a low boiling point is added thereto to form a liquid system. It is also possible to heat such liquid system formed by addition of the hydrocarbon of a low boiling point. During contact, m-nitrobenzoic acid may be either in the solid state or in the liquid state. However, in order to complete the complex-forming reaction in a short period of time, it is preferable to add m-nitrobenzoic acid to the starting isomeric mixture or hydrocarbon mixture and mix them in the liquid state under heat. Preferable heating temperatures range from 60°–150°C. When the reaction is carried out while maintaining both in the dissolved state as described above, the resulting liquid reaction mixture is cooled and precipitated solids are separated from the reaction mixture. The precipitated solid is composed of complexes of m-nitrobenzoic acid with isomers of DMN, the main component of which is the complex of m-nitrobenzoic acid with 2,6-DMN. It is sufficient to conduct the above cooling only so that solid precipitates may be formed. In general, the higher the temperature reducing degree during this cooling step, the more selectively precipitated is the complex of m-nitrobenzoic acid with 2,6-DMN. On the other hand, when the cooling is effected to too low a temperature a tendency appears that the content of the 2,6-DMN complex is lowered in the precipitated solids and amounts of complexes of other isomers such as 2,7 DMN, 1,6-DMN, 1,7-DMN and 2,3-DMN are increased. In accordance with the process of this invention, the complex of 2,6-DMN is generally precipitated predominately at first, followed by formation of the complex of 2,7-DMN.

It is preferred that the amount of m-nitrobenzoic acid to be used for formation of such complex is 0.1 – 5 moles, especially 1 – 4 moles per mole of 2,6-DMN contained in the starting material, and is less than 2 moles, especially less than 1.5 moles, per mole of the total of DMN isomers contained in the starting material. When m-nitrobenzoic acid is used in an amount within the above range, a complex of m-nitrobenzoic acid with 2,6-DMN is formed at a high catching ratio and a high selectivity. In the present specification the term "catching ratio" means a ratio of the 2,6-DMN separated in the form of the complex to the total of 2,6-DMN contained in the starting mixture of DMN isomers.

When the above-mentioned complex-forming reaction is carried out in the presence of a monocyclic aromatic hydrocarbon of six to nine carbon atoms in an amount of 0.1 – 1 part by weight, especially 0.2 – 0.5 part by weight, based on the total of the DMN isomers in the starting material mixture, the complex of m-nitrobenzoic acid with 2,6-DMN can be formed at a higher catching ratio and a higher selectivity.

The 2,6-DMN catching ratio varies depending on the amount of m-nitrobenzoic acid used, and if it is used in a large amount, 2,6-DMN can be caught almost completely. However, in this case, the purity of 2,6-DMN obtained by decomposition of the resulting complex is low. When m-nitrobenzoic acid is used in a small amount, the catching ratio is lowered, but the purity of the final 2,6-DMN product is increased. In this invention, 2,6-DMN can be separated in the form of the complex with m-nitrobenzoic acid at an extremely high catching ratio and a high selectivity by using m-nitrobenzoic acid in an amount within the above mentioned range and, if desired, conducting the complex-forming reaction in the presence of the above-mentioned monocyclic aromatic hydrocarbon.

Thus, in accordance with the process of this invention, when a DMN mixture containing, for instance, 11 percent of 2,6-DMN and almost the same amount of 2,7-DMN is mixed with 12 mole percent of m-nitrobenzoic acid, by one operation a complex mixture comprising 60 – 70 percent of the 2,6-DMN complex can be obtained. In this case the filtrate contains about 6 – 8 percent of 2,6-DMN, and the 2,6-DMN catching ratio is 30 – 40 percent. When the same DMN isomer mixture is contacted with 50 mole percent of m-nitrobenzoic acid, a complex mixture containing 35 – 45 percent of the 2,6-DMN complex is obtained and the filtrate contains about 0.5 – 2 percent of 2,6-DMN. In this case, the 2,6-DMN catching ratio is as high as 90 – 95 percent. When a 2,6-DMN of a higher purity is wanted, a DMN isomer mixture comprising 35 – 70 percent of 2,6-DMN which is obtained by decomposing the complex mixture formed above, is subjected to the above treatment again. For instance, when a DMN isomer mixture containing 2,6-DMN at a content of 40 – 50 percent is treated with m-nitrobenzoic acid in a manner as described above, a complex mixture comprising 75 – 85 percent of the 2,6-DMN complex can be obtained. When this procedure is further repeated twice, a complex mixture comprising more than 98 percent of the 2,6-DMN complex can be obtained.

Further, it was found that complexes of m-nitrobenzoic acid with DMN isomers other than 2,6-DMN are easily converted to the 2,6-DMN complex in the presence of 2,6-DMN. Accordingly, when complexes formed from the starting DMN isomer mixture and m-nitrobenzoic acid are not decomposed but are treated together with a fresh starting mixture, the content of 2,6-DMN in the resulting mixture can be gradually increased. For instance, if a DMN-m-nitrobenzoic acid complex mixture comprising 40 percent of the 2,6-DMN complex is mixed with a starting material comprising 11 percent of 2,6-DMN and almost the same amount of 2,7-DMN and the resulting mixture is heated, melted and cooled, a complex mixture comprising about 60 – 70 percent of the 2,6-DMN complex can be obtained.

In accordance with this invention, the above mixture of complexes of m-nitrobenzoic acid with DMN isomers, the main component of which is the 2,6-DMN complex, is precipitated in the form of stable solid crystals preferably by cooling it appropriately. The cooling temperature is determined by the desired amount of the precipitated crystals. In general, it is preferred that the precipitation is performed at a temperature lower by at least 5°C. than the temperature adopted at the complex-forming reaction and within a range of room temperature to 70°C. Of course, no particular disadvantage is brought about if the precipitation of solid crystals is effected at a temperature a little lower or higher than the above range.

Precipitated crystals can be separated from the liquid reaction mixture by an optional solid-liquid separating technique, such as filtration and centrifugal separation. The separated complex may be purified, according to need. For this purification, it is preferable to recrystallize the complex from a solvent selected from aromatic hydrocarbons, ethers, esters, alcohols and ketones. As the aromatic hydrocarbon, aromatic hydrocarbons of six to nine carbon atoms, such as benzene, toluene, xylene, trimethyl benzene, ethyl benzene, methyl ethyl benzene and cumene may be cited. As the ether, those preferably used are diethyl ether, diisopropyl ether, tetrahydrofuran and dioxane. As the alcohol, methanol, ethanol and isopropyl alcohol are preferred. Acetone and methyl ethyl ketone are especially preferred as the ketone. Ethyl acetate is most preferred as the ester. It is also possible to use a mixed solvent comprising two or more of the above solvents. In case the purification by recrystallization is conducted, the complex of a suitable amount is dissolved under suitable heating conditions in a solvent such as recited above by a known method, then the solution is cooled to a suitable temperature, and the precipitated crystals are separated therefrom by a known method.

DECOMPOSITION OF COMPLEX

In order to decompose a mixture of complexes of m-nitrobenzoic acid with DMN isomers, which has thus obtained in accordance with this invention and the main component of which is the complex of m-nitrobenzoic acid with 2,6-DMN, to a mixture of DMN isomers and m-nitrobenzoic acid, it is preferable to use in principal the following four methods.

A. A method comprising heating the mixture of complexes at a temperature not lower than 50°C. but preferably up to the decomposition of benzoic acid (which will be referred to as "decomposition method A" hereinbelow).

B. A method comprising contacting the mixture of complexes with a solvent which hardly dissolves m-nitrobenzoic acid but dissolves DMN well (which will be referred to as "decomposition method B" hereinbelow).

C. A method comprising contacting the mixture of complexes with a solvent which hardly dissolves DMN but dissolves m-nitrobenzoic acid well (which will be referred to as "decomposition method C" hereinbelow).

D. A method comprising contacting the mixture of complexes coincidentally or alternately with solvents used in above methods B and C which are immiscible with each other (which will be referred to as "decomposition method D" hereinbelow).

A. DECOMPOSITION METHOD A

As the decomposition method belonging to this group, a method may be cited comprising heating the mixture of complexes at a temperature not lower than 50°C. preferably in an atmosphere of an inert gas. Although the decomposition may be accomplished by heating the complex mixture at a temperature not lower than 50°C. in the air, it is preferable to conduct the heating in an atmosphere of an inert gas such as nitrogen, carbon dioxide gas, hydrogen and a lower hydrocarbon, e.g., methane and ethane, because the heating in an oxidizing atmosphere results in a tendency that the resulting mixture of DMN isomers, whose main component is 2,6-DMN, is colored or decomposed.

In conducting the heating of the complex mixture preferably in an inert gas atmosphere, it is possible to recover the DMN mixture composed mainly of 2,6-DMN coincidentally with decomposition of the complex mixture according to the distillation or volatilization technique by heating the complex mixture at a temperature exceeding the distilling or volatilizing temperature.

Further, in conducting decomposition of the complex according to the method A, it is possible to heat the complex mixture in a solvent to be used in the decomposition method B, C or D, which will be detailed below, at a temperature exceeding 50°C.

The upper limit of the heating temperature is the decomposition temperature of 2,6-DMN, and any temperature may be adopted as long as it is not lower than 50°C. but up to the decomposition temperature of 2,6-DMN. However, in view of the recovery and reuse of m-nitrobenzoic acid, it is preferable to conduct the heating at a temperature lower than the decomposition temperature of m-nitrobenzoic acid. Especially preferable heating temperatures are within a range of 80° to 150°C.

Still further, it is possible to conduct the above heating for decomposition while keeping the complex mixture in the state dissolved in a recrystallization solvent. In this case, it is preferred that a DMN mixture composed mainly of 2,6-DMN is recovered by blowing, for instance, steam into the solvent solution of the complex mixture and distilling off the DMN mixture composed mainly of 2,6-DMN together with the vapor of the recrystallization solvent. In general, m-nitrobenzoic acid is soluble in such recrystallization solvent. Accordingly, if the decomposition is accomplished by the above-mentioned steam-distillation method, m-nitrobenzoic acid is left in the dissolved or partially suspended state, depending on the temperature, in the water which is not distilled.

B. DECOMPOSITION METHOD B

The decomposition method B comprises contacting the complex mixture closely with a solvent which hardly dissolves m-nitrobenzoic acid but dissolves DMN well.

As such solvent there may be preferably used aliphatic or alicyclic hydrocarbons of three to nine carbon atoms, especially three to seven carbon atoms, saturated ones being particularly preferred, such as propane, butane, petroleum ether, pentane, hexane, heptane, octane, ligroin, cyclopentane and cyclohexane. Hydrocarbons of more carbon atoms are not preferred because the solubility of m-nitrobenzoic acid in these hydrocarbons tends to increase. The amount of the solvent used is not critical, but as the amount of m-nitrobenzoic acid dissolved increases in proportion to the amount of the solvent used, it is preferable to use the solvent in a smaller amount, for instance, 0.5 – 10 parts by weight per part by weight of the complex mixture to be decomposed.

The m-nitrobenzoic acid dissolved in the solvent may be removed by extraction with hot water after the decomposition treatment.

In conducting the decomposition by contacting the complex mixture with such solvent, it is preferable to heat the system at a temperature not lower than 50°C. but up to the decomposition temperature of 2,6-DMN, especially up to the decomposition temperature of m-nitrobenzoic acid, particularly preferred temperatures being in the range of 70° to 150°C., as described with respect to the decomposition method A.

C. DECOMPOSITION METHOD C

According to this decomposition method C, the complex mixture is decomposed by contacting it with a solvent which hardly dissolves DMN but dissolves m-nitrobenzoic acid well. As the solvent the following may be preferably used:

i. Water.
ii. Alkaline aqueous solutions.
iii. Lower aliphatic alcohols.

Considering only the ability of dissolving the complex mixture completely, the use of alkaline aqueous solutions is most preferred, but it involves an industrial problem in that m-nitrobenzoic acid is recovered in the form of an alkali salt. From this viewpoint, the use of water or a water-containing lower aliphatic alcohol, especially water, is preferred. The use of a lower aliphatic alcohol, however, is advantageous in that the purification of the resulting DMN occurs mixture composed mainly of 2,6-DMN coincidentally with the decomposition of the complex mixture.

As the alkali used for the alkaline aqueous solution, water-soluble hydroxides, oxides and carbonates of alkali metals and alkaline earth metals; aqueous ammonia; and water-soluble amines may be used. The use of aqueous ammonia is especially preferred in actual operation.

In this method C, the temperature conditions as described with respect to the decomposition method B may be similarly adopted. However, in this method C, especially if an alkaline aqueous solution or a lower aliphatic alcohol is used, the decomposition of the complex can be accomplished rather smoothly at a temperature lower than 50°C., for instance, at room temperature.

The amount of the solvent used is not particularly critical in the case of water or an alkaline aqueous solution. When a lower aliphatic alcohol is used, it is preferable to use it in an amount of 2 – 10 parts by weight, especially 3 – 6 parts by weight, per part by weight of the complex mixture.

As the lower aliphatic alcohol, methanol and ethanol are preferably used.

D. DECOMPOSITION METHOD D

In this decomposition method D, at least one solvent described with respect to the method B and at least one solvent described with respect to the method C, which are immiscible with each other, are used, and the complex mixture is contacted coincidentally or alternately with such solvents.

In this decomposition method D, the use of a combination of i. at least one saturated hydrocarbon of three to nine carbon atoms, especially three to seven carbon atoms, such as described with respect to the decomposition method B, and ii. at least one solvent selected from water and alkaline aqueous solution is especially preferred.

As described above, the amount of the solvent (ii) used is not particularly critical, while it is preferable to use the solvent (i) in an amount of 0.1 – 5 parts by weight, especially 0.5 – 3 parts by weight, per part by weight of the complex mixture.

When the decomposition of the complex mixture is carried out in accordance with this method D, each of the solvents (i) and (ii) is charged in a decomposition vessel, a suitable amount of the complex mixture is added thereto, and the mixture is well blended and agitated. In this case, when water is used as the solvent (ii), it is preferable to heat the system at a temperature of 80° – 150°C. When an alkaline aqueous solution is used as the solvent (ii), it is unnecessary to effect heating.

It is preferable to conduct the agitation until both of the solvents (i) and (ii) become transparent. By such procedure, the complex mixture is decomposed to a DMN mixture composed mainly of 2,6-DMN which is substantially dissolved in the layer of the saturated hydrocarbon (i) and m-nitrobenzoic acid which is substantially dissolved in the layer of the solvent (ii). Then, both layers are separated from each other, and when the aqueous layer is cooled, m-nitrobenzoic acid is precipitated. In the case of the use of an alkaline aqueous solution, m-nitrobenzoic acid is precipitated by addition of a mineral acid. A DMN mixture composed mainly of 2,6-DMN can be separated and recovered by distilling off a part of the solvent (i) from the solvent layer and then cooling it, or by distilling off substantially the whole of the solvent (i).

As the decomposition method D a method may be adapted comprising agitating and mixing the complex mixture in the solvent (i) preferably under heating, adding thereto the solvent (ii), and agitating the mixture, if required, under heating. In this method, the order of addition of the solvents (i) and (ii) may be reversed.

The so recovered DMN mixture comprising 2,6-DMN as the main component may be further purified by the above-mentioned recrystallizing or known purification method, if desired.

This invention will now be described by referring to examples, but these examples are given for illustration of this invention and this invention is not at all limited by these examples.

EXAMPLE I-1

Six hundred grams of a hydrocarbon mixture containing DMN, obtained by concentrating a petroleum fraction, the hydrocarbon mixture comprising 12.0 percent of 2,6-DMN, 12.0 percent of 2,7-DMN, 53.8 percent of other DMN isomers, 6.9 percent of ethyl naphthalenes and 15.3 percent of other hydrocarbons, were mixed with 300 g of m-nitrobenzoic acid, and the mixture was heated at 110°C. to form a solution. Then, it was cooled to room temperature. The precipitated yellow solids were subjected to a centrifuge rotated at 3300 r.p.m. for 20 minutes to obtain 400 g of a crude complex product comprising 55.3 percent of the 2,6-DMN complex and 20.1 percent of 2,7-DMN complex.

EXAMPLE I-2

Eight hundred grams of the same hydrocarbon mixture containing DMN, as used in Example I-1 were mixed with 400 g of m-nitrobenzoic acid, and the mixture was heated at 100°C. to form a solution. Then, it was cooled to room temperature and the precipitated solids were separated by filtration and subjected to a centrifuge rotated at 2400 r.p.m. for 20 minutes to obtain 556 g of a crude complex product comprising 50.6 percent of the 2,6-DMN complex and 20.1 percent of the 2,7-DMN complex. In the mother liquor left after the separation of the complex, there were 0.8 percent of 2,6-DMN and 8.9 percent of 2,7-DMN.

EXAMPLE I-3

One hundred and fifty grams of m-nitrobenzoic acid were added to a hydrocarbon mixture containing 78 percent of DMN (12.0 percent of 2,6-DMN and 12.0 percent of 2,7-DMN), obtained from a petroleum fraction, and the mixture was heated at 150°C. to form a solution. Then, it was allowed to cool and the precipitated solids were separated from the mother liquor by subjecting it to a centrifuge operated at 3000 r.p.m. for 19 minutes to obtain 210 g of a crude complex product comprising 50.8 percent of the 2,6-DMN complex and 21.8 percent of the 2,7-DMN complex.

EXAMPLE I-4

To 40.7 g of a DMN mixture comprising 25.0 percent each of 2,6-DMN, 2,7-DMN, 1,6-DMN and 1,5-DMN, 10.7 g of m-nitrobenzoic acid were added, and the mixture was heated to form a solution. Then, it was cooled to room temperature (18°C.), and the precipitated solids were separated by filtration and washed with 50 ml of petroleum ether to obtain 15.6 g of a crude complex product.

The above procedures were repeated by employing m-nitrobenzoic acid in amounts of 21.4 g, 42.8 g and 85.5 g, respectively and washing the precipitated solids with petroleum ether in amounts of 100 ml, 200 ml and 300 ml, respectively, to obtain a crude complex product in yields of 30.7 g, 61.0 g and 111.1 g, respectively. Results of the analysis of the complex obtained in each run are shown in Table I-1.

TABLE I-1

| Run Number | Amount of m-NBA (g.) | Yield of complex (g.) | Amount of DMN in complex (g.) | DMN composition in complex (percent) | | | | Catching ratio (percent) |
|---|---|---|---|---|---|---|---|---|
| | | | | 2,6-DMN | 2,7-DMN | 1,6-DMN | 1,5-DMN | |
| 1 | 10.7 | 15.6 | 4.9 | 72.7 | 16.2 | 6.5 | 4.5 | 36 |
| 2 | 21.4 | 30.7 | 9.3 | 68.8 | 20.1 | 7.0 | 4.5 | 64 |
| 3 | 42.8 | 61.0 | 18.2 | 52.7 | 28.2 | 12.2 | 6.9 | 96 |
| 4 | 85.5 | 111.1 | 25.6 | 38.1 | 30.1 | 18.8 | 12.9 | 97 |

NOTE.—m-NBA = abbreviation of m-nitrobenzoic acid.

EXAMPLE I-5

To 50.0 g of a starting DMN mixture of the composition indicated in Table I-2, 25.0 g of m-nitrobenzoic acid were added and the mixture was maintained at 80°C. for 10 minutes to form a homogeneous solution. Then it was allowed to cool. The precipitated crystals were separated by filtration, washed with petroleum ether and dried to obtain 34.0 g of a crude complex product. Then it was treated with a 5 percent aqueous solution of caustic soda to obtain 10.7 g of a mixture of DMN isomers. The results of the analysis are shown in Table I-2. The 2,6-DMN catching ratio was 92 percent.

TABLE I-2

|  | Composition of starting mixture (% by wt.) | Composition of filtrate (% by wt.) | Composition of DMN mixture separated from complex (% by wt.) |
|---|---|---|---|
| 2,6-DMN | 10.8 | 1.0 | 45.7 |
| 2,7-DMN | 12.1 | 8.4 | 22.7 |
| Other DMN isomers | 54.8 | 60.4 | 24.4 |
| Ethyl naphthalenes | 6.9 | 8.3 | 2.3 |
| Other hydrocarbons | 11.9 | 20.7 | 2.8 |

EXAMPLE I-6

To 34.0 g of a crude complex product of the same composition as that of the complex obtained in Example I-5, 50.0 g of a starting DMN mixture of the same composition as that of the starting mixture used in Example I-5 were added and the mixture was heated at 90°C. to form a solution. Then it was allowed to cool to precipitate 33.8 g of a complex. The results of the analysis of the DMN composition of the complex are shown in Table I-3.

TABLE I-3

|  | Hydrocarbon composition Starting complex (% by weight) | Hydrocarbon composition of resulting complex (% by weight) |
|---|---|---|
| 2,6-DMN | 45.7 | 63.3 |
| 2,7-DMN | 22.7 | 15.7 |
| Other DMN isomers | 24.4 | 16.7 |
| Ethyl naphthalenes | 2.3 | 1.4 |
| Other hydrocarbons | 2.8 | 1.9 |

EXAMPLE I-7

To 10.7 g of the DMN mixture obtained in Example I-5, 10.5 g of m-nitrobenzoic acid were added and the mixture was dissolved in ether. The ether was then evaporated to precipitate a complex product, which was then washed with petroleum ether. The yield was 15.3 g. The so obtained complex product was decomposed in the same manner as in Example I-5 to obtain 5.06 g of a DMN mixture. The results of the analysis of the mixture and of the petroleum ether washing liquor after washing are shown in Table I-4. In this Example, the 2,6-DMN catching ratio was 78.5.

TABLE I-4

|  | Composition of starting mixture (% by weight) | Composition of hydrocarbons contained in washing liquor after washing (% by weight) | Hydrocarbon composition in complex before decomposition (% by weight) |
|---|---|---|---|
| 2,6-DMN | 45.7 | 11.8 | 78.8 |
| 2,7-DMN | 22.7 | 31.0 | 13.4 |
| Other DMN isomers | 24.4 | 47.3 | 6.7 |
| Ethyl naphthalenes | 2.3 | 4.3 | 0.23 |
| Other hydrocarbons | 2.8 | 5.4 | 0.94 |

EXAMPLES I-8 and I-12

To a mixture of an amount indicated in Table I-5 of toluene and 10.0 g of a DMN mixture comprising 11.4 percent by weight of 2,6-DMN, 12.9 percent by weight of 2,7-DMN, 53.3 percent by weight of other DMN isomers, 7.3 percent by weight of ethyl naphthalenes and 10.6 percent by weight of other hydrocarbons, 3.5 g of m-nitrobenzoic acid were added and the mixture was heated for 10 minutes maintained at 80°C. to form a homogeneous solution. Then it was allowed to cool and precipitated complex crystals were washed with petroleum ether. In order to determine the 2,6-DMN purity in the resulting complex, it was shaken with a 5 percent aqueous solution of sodium hydroxide to decompose it. The ether layer was separated and the ether was distilled off to obtain a DMN mixture. The results of the gas chromatography analysis of the resulting DMN mixture are shown in Table I-5. As a comparison, the above procedure was repeated without use of toluene, and the results of this comparative run are also shown in Table I-5.

TABLE I-5

| Example Number: | Amount of toluene (g.) | Yield of complex (g.) | Hydrocarbon composition in complex (percent by weight) | | | | | 2,6-DMN catching ratio (percent) |
|---|---|---|---|---|---|---|---|---|
|  |  |  | 2,6-DMN | 2,7-DMN | Other DMN's | Ethyl naphthalenes | Other hydrocarbons |  |
| I-8 | 10.0 | 4.23 | 61.1 | 19.0 | 16.5 | 1.3 | 3.2 | 72 |
| I-9 | 5.0 | 4.44 | 61.1 | 19.4 | 16.5 | 1.3 | 1.9 | 75 |
| I-10 | 3.0 | 4.83 | 55.6 | 20.3 | 18.9 | 1.6 | 2.3 | 75 |
| I-11 | 2.0 | 4.85 | 54.0 | 21.4 | 20.0 | 1.7 | 2.5 | 73 |
| I-12 | 1.0 | 4.86 | 52.3 | 21.8 | 21.3 | 2.0 | 2.8 | 71 |
| Comparison | 0 | 5.07 | 50.2 | 21.1 | 22.6 | 2.0 | 2.7 | 71 |

EXAMPLES I-13 TO I-15

One hundred grams (100.0 g) of the DMN containing hydrocarbon mixture used in Example I-1 were contacted with 50.0 g of m-nitrobenzoic acid at a temperature indicated in Table I-6, and the mixture was cooled to 30°C. The precipitated solids were separated by filtration, washed with 70 ml of petroleum ether and dried to obtain a complex product. Then, it was decomposed in the same manner as in Example I-4 to obtain a DMN mixture. The result of the analysis of the DMN mixture are shown in Table I-6.

TABLE I-6

| Example Number: | Contact temperature (°C.) | Yield of complex (g.) | Amount of DMN's in complex (g.) | Composition of resulting DMN mixture (percent by weight) | | | | | 2,6-DMN catching ratio (percent) |
|---|---|---|---|---|---|---|---|---|---|
|  |  |  |  | 2,6-DMN | 2,7-DMN | Other DMN's | Ethyl naphthalenes | Other hydrocarbons |  |
| I-13 | 100 | 69.5 | 22.2 | 50.6 | 20.7 | 23.3 | 1.9 | 3.5 | 93 |
| I-14 | 60 | 67.5 | 20.9 | 51.6 | 20.1 | 24.5 | 1.6 | 2.2 | 80 |
| I-15 | 30 | 63.5 | 16.4 | 58.0 | 16.3 | 19.1 | 2.4 | 4.2 | 79 |

EXAMPLES I-16 AND I-17

One hundred grams (100.0 g) of the DMN-containing hydrocarbon mixture used in Example I-1 were contacted at 100°C. with 50.0 g of m-nitrobenzoic acid and the mixture was cooled to a temperature indicated in Table I-7. The precipitated solids were separated by filtration, washed with an amount indicated in Table I-7 of petroleum ether and dried to obtain a complex product. It was then decomposed in the same manner as in Example I-4. The results are shown in Table I-7 together with the results of Example I-13.

gas chromatography. The remainder of the complex product was recrystallized again from toluene to yield 2.13 g of a refined complex product, which was analyzed in the same manner as above. The results are shown in Table II-1.

TABLE II-1

|  | Composition of starting complex (% by weight) | Composition of complex product after 1st recrystallization (% by weight) | Composition of complex product after 2nd recrystallization (% by weight) |
|---|---|---|---|
| 2,6-DMN | 45.7 | 84.2 | 97.7 |
| 2,7-DMN | 22.7 | 13.1 | 2.3 |
| Other DMN's | 24.4 | 2.0 | 0.0 |
| Ethyl naphthalenes | 2.3 | 0.0 | 0.0 |
| Other hydrocarbons | 2.8 | 0.7 | 0.0 |

TABLE I-7

| Example Number | Crystallization temperature (°C.) | Yield of complex (g.) | Amount of DMN's in complex (g.) | Amount of petroleum ether (ml.) | Composition of resulting DMN mixture (percent by weight) |  |  |  |  | Catching ratio (percent) |
|---|---|---|---|---|---|---|---|---|---|---|
|  |  |  |  |  | 2,6-DMN | 2,7-DMN | DMN's | Ethyl naphthalenes | Other hydrocarbons |  |
| I-13 | 30 | 69.5 | 22.2 | 70 | 50.6 | 20.7 | 23.3 | 1.9 | 3.5 | 93 |
| I-16 | 60 | 56.2 | 17.9 | 70 | 56.3 | 18.3 | 21.2 | 1.6 | 2.6 | 84 |
| I-17 | 80 | 39.0 | 12.4 | 50 | 65.3 | 16.7 | 15.2 | 1.3 | 1.5 | 67 |

EXAMPLE II-1

When 130 g of the crude complex product obtained in Example I-1 were washed with 130 ml of methanol at room temperature, 81.2 g of a complex product comprising 80.6 percent of the 2,6-DMN complex and 12.3 percent of the 2,7-DMN complex were obtained. This complex product was recrystallized from 105 ml of methanol to obtain 51.3 g of a purified complex product comprising 95.4 percent of the 2,6-DMN complex and 4.6 percent of the 2,7-DMN complex.

EXAMPLE II-2

One hundred and fourty grams of the crude complex product obtained in Example I-2 were washed twice with 135 ml of methanol to yield 80.4 g of a purified complex product comprising 85.0 percent of the 2,6-DMN complex and 10.5 percent of the 2,7-DMN complex.

EXAMPLE II-3

One hundred and twenty grams of the crude complex product obtained in Example I-2 were washed twice with 540 ml of n-heptane to yield 100 g of complex crystals comprising 83.2 percent of the 2,6-DMN complex and 12.3 percent of the 2.7-DMN complex.

EXAMPLE II-4

With use of 13 cc of toluene, 3.50 g of a complex mixture obtained in the same manner as in Example I-5 were recrystallized. The yield was 2.62 g. In order to determine the content of the 2,6-DMN complex content in the resulting complex product, a part of the product was taken and dissolved in ether and decomposed by addition of a 5 percent aqueous solution of sodium hydroxide. The ether layer was analyzed by the gas chromatography.

EXAMPLE II-5

With use of 90 cc of methanol, 35.0 g of the same complex product as used in Example II-1, the yield of the recrystallized product was 13.8 g. The results of the analysis of the recrystallized product conducted in the same manner as in Example II-4 are shown in Table II-2.

TABLE II-2

|  | Composition of recrystallized complex product (% by weight) |
|---|---|
| 2,6-DMN | 78.2 |
| 2,7-DMN | 15.4 |
| Other DMN's | 3.6 |
| Ethyl naphthalenes | 0.8 |
| Other hydrocarbons | 2.0 |

EXAMPLES II-6 to II-14

3.0 Grams of a complex product obtained from a DMN mixture and m-nitrobenzoic acid were recrystallized from a solvent indicated in Table II-3. The hydrocarbon composition of the starting complex product was 60.1 percent of 2,6-DMN, 18.3 percent of 2,7-DMN, 17.7 percent of other DMN isomers and 3.9 percent of other hydrocarbons. In the same manner as in Example II-1 the resulting recrystallized complex product was decomposed and analyzed by the gas chromatography. Results are shown in Table II-3.

TABLE II-3

| Example number | Solvent Kind | Amount used (ml.) | Yield of complex (g.) | Hydrocarbon composition in complex (percent by weight) |  |  |  |  |
|---|---|---|---|---|---|---|---|---|
|  |  |  |  | 2,6-DMN | 2,7-DMN | Other DMN's | Ethyl naphthalenes | Other hydrocarbons |
| II-6 | Benzene | 13 | 2.20 | 90.0 | 6.8 | 6.2 | 0.4 | 1.6 |
| II-7 | Toluene | 13 | 2.20 | 93.5 | 5.4 | 0.8 | 0.3 | 0.0 |
| II-8 | Xylene | 16 | 2.20 | 93.8 | 4.5 | 1.3 | 0.4 | 0.0 |
| II-9 | Mesitylene | 15 | 2.35 | 93.3 | 5.5 | 0.9 | 0.3 | 0.0 |
| II-10 | Ethyl ether | 20 | 1.35 | 91.1 | 5.9 | 1.8 | 0.5 | 0.7 |
| II-11 | Tetrahydrofuran | 10 | 0.80 | 92.7 | 4.2 | 2.4 | 0.3 | 0.4 |
| II-12 | Dioxane | 8 | 0.95 | 92.0 | 6.8 | 0.6 | 0.6 | 0.0 |
| II-13 | Methyl ethyl ketone | 8 | 1.20 | 92.3 | 4.5 | 1.8 | 0.4 | 1.0 |
| II-14 | Ethyl acetate | 10 | 1.40 | 91.0 | 7.4 | 0.6 | 0.5 | 0.5 |

EXAMPLE III-1

A vessel equipped with a reflux cooler was charged with 51.3 g of the purified complex product obtained in Example II-1, and 1500 ml of water were added thereto. Then the mixture was heated to reflux water. The DMN distilled by steam distillation was trapped to obtain 16.1 g of 2,6-DMN of a purity of 98.5 percent. The yield of 2,6-DMN based on 2,6-DMN contained in the starting material was 67.6 percent. After completion of the decomposition, the water layer was cooled to recover 33.5 g of m-nitrobenzoic acid.

EXAMPLE III-2

In the same manner as in Example III-1, 80 g of the purified complex product obtained in Example II-2 were treated together with 1350 ml of water. Thus, 22.8 g of a DMN mixture comprising 85.3 percent of 2,6-DMN were obtained and 10.8 percent of 2,7-DMN. The water layer was cooled to recover 53.0 g of m-nitrobenzoic acid.

The resulting DMN mixture (22.8 g) was recrystallized from 320 g of methanol to yield 16.1 g of 2,6-DMN of a purity of 99.5 percent. The overall catching ratio of 2,6-DMN based on the starting material was 66.6 percent.

EXAMPLE III-3

In ether 100 g of crystals obtained in Example II-2, were dissolved and 15 percent aqueous ammonia was added thereto. The mixture was shaked to decompose the complex. The ether layer was washed with water and ether was distilled off to yield 20.2 g of a DMN mixture comprising 83.6 percent of 2,6-DMN and 12.5 percent of 2,7-DMN. This DMN mixture was recrystallized from 49.8 g of n-heptane to yield 13.7 g of 2,6-DMN of a purity of 96.7 percent. Distillation of n-heptane from the mother liquor after the recrystallization gave 6.5 g of a DMN mixture comprising 56.5 percent of 2,6-DMN and 31.8 percent of 2,7-DMN. When the aqueous ammonia layer obtained at the decomposition of the complex was made acidic with dilute sulfuric acid, 79.2 g of m-nitrobenzoic acid were recovered.

EXAMPLE III-4

In 200 g of methanol 50.00 g of a crude complex product obtained according to the method of Example I-3, were dissolved at room temperature and the solution was cooled to −15°C. The precipitated solids of a faintly yellowish white color were separated by filtration, and washed with 50 g of methanol cooled to 0°C. to yield 8.86 g of white solids (crude 2,6-DMN) comprising 83.5 percent of 2,6-DMN and 2.7 percent of 2,7-DMN. The solids were recrystallized from 90 g of methanol to yield 5.48 g of 2,6-DMN of a purity of 96.4 percent. The yield of 2,6-DMN based on the starting material containing 12 percent of 2,6-DMN was 61.7 percent. As a result of the alkali titration analysis it was found that this 2,6-DMN product comprised 0.68 percent by weight of m-nitrobenzoic acid.

EXAMPLE III-5

In 100.0 g of methanol 50.00 g of the crude complex product obtained in Example I-3, were dissolved at 45°C. and the solution was cooled to 10°C. The precipitated solids were collected by filtration and washed with 50 g of methanol cooled to 0°C. to yield 4.31 g of crude 2,6-DMN comprising 95.7 percent of 2,6-DMN and 3.9 percent of 2,7-DMN. The remaining filtrate and washing liquor were combined and cooled to −15°C. to precipitate solids of a faintly yellow color. The solids were collected by filtration and washed with 50 g of methanol cooled to 0°C. to yield crude 2,6-DMN comprising 86.5 percent of 2,6-DMN and 11.5 percent of 2,7-DMN. Similar treatment of the filtrate and washing liquor was repeated twice by changing the cooling temperature to −25°C. and −27°C. to obtain 1.84 g of crude 2,6-DMN comprising 80.5 percent of 2,6-DMN and 19.6 percent of 2,6-DMN and 1.04 g of a crude DMN product comprising 32.1 percent of 2,6-DMN and 53.6 percent of 2,7-DMN, respectively. These crude products were combined with crude products obtained above, and they were recrystallized from 90 g of methanol to obtain 7.23 g of 2,6-DMN of a purity of 95.0 percent. The yield of 2,6-DMN based on 2,6-DMN contained in the starting material was 80.0 percent. As a result of the alkali titration analysis, it was found that the product contained 0.87 percent by weight of m-nitrobenzoic acid.

COMPARATIVE EXAMPLE

One hundred and ninety grams of the same DMN containing hydrocarbon mixture as used in Example I-2 were cooled to 0°C., and the precipitated white solids were separated by filtration to yield 16.0 g of a crude DMN product containing 45.01 percent of 2,6-DMN and 15.01 percent of 2,7-DMN. This crude product was recrystallized from 50 ml of methanol and then from 75 ml of methanol to obtain 4.35 g of 2,6-DMN of a purity of 99.9 percent. The yield of 2,6DMN based on 2,6-DMN contained in the starting material mixture was 21.2 percent.

EXAMPLE III-6

A glass autoclave was charged with 20.0 g of the crude complex product obtained in Example I-1, 110 g of water and 10.0 g of heptane, and the mixture was heated at 120°C. for 20 minutes under agitation. At that time, the gauge pressure reached 2.0 kg/cm². The agitation was stopped and 10 minutes later the water layer was separated in that state. Distillation of the solvent from the organic layer gave 7.23 g of a crude DMN product which contained 10.9 percent of m-nitrobenzoic acid. Together with 30 g of heptane and 110 g of water, the crude product was treated in the same manner as above to yield 6.50 of DMN in which the content of m-nitrobenzoic acid was reduced to 1.2 percent. From the water layer 12.2 g of m-nitrobenzoic acid were recovered.

Example III-7

Together with 200 g of water and 6.8 g of heptane, 19.0 g of a complex product obtained by the same method as adopted in Example I-5 were treated at 130°C. for 20 minutes in the same manner as in Example IIIg6 to yield 6.51 g of a crude DMN product which contained 6.3 percent of m-nitrobenzoic acid. This crude DMN product (6.51 g) was dissolved in 68 g of heptane and contacted with 60 g of water at 60°C. to yield 6.13 g of DMN in which the content of m-nitrobenzoic acid was reduced to 0.62 percent. When the water layer was cooled, 11.9 g of m-nitrobenzoic acid were precipitated and recovered.

EXAMPLE III-8

Together with 20 g of n-heptane and 200 g of water, 10.00 g of a complex product obtained by the same method as in Example I-5 were agitated at 95°C. until the solid portion was completely dissolved. For a while the mixture was allowed to stand and then the water layer was removed therefrom. The remaining organic layer was washed twice with 400 g of water heated at 95°C. Distillation of the solvent gave 3.01 g of DMN which contained 1.3 percent of m-nitrobenzoic acid.

EXAMPLE III-9

20.0 Grams of the complex product obtained in Example I-1 were treated at 120°C. for 15 minutes with 20 g of cyclohexane and 200.0 g of water in the same manner as in Example III-6, and the water layer was removed. Without separation of the crude DMN from the organic layer, 500 g of water were added to the remaining organic layer and the mixture was treated at 120°C. for 15 minutes, followed by removal of the water layer. From the remaining organic layer 6.48 g of DMN which contained 0.8 percent of m-nitrobenzoic acid were recovered.

EXAMPLE III-10

10.00 Grams of the complex product obtained in Example I-1 were treated at 75°C. with 20 g of cyclohexane and 210 g of water in the same manner as in Example III-6, and the organic layer was washed twice with 400 g of water heated at 75°C. to yield 3.12 g of DMN which contained 1.5 percent of m-nitrobenzoic acid.

EXAMPLE III-11

16.0 grams of a complex product obtained according to the same method as adopted in Example I-1 were treated at 140°C. with 15.0 g of ligroin and 130 g of water in the same manner as in Example III-6 to yield 6.60 g of a crude DMN product containing 17.9 percent of m-nitrobenzoic acid. Then, the crude product was treated at 150°C. with 32 g of ligroin and 110 g of water in the same manner as in Example III-6 to yield 4.60 g of DMN of a m-nitrobenzoic acid content of 3.2 percent. When the water layer were cooled, 9.2 g of m-nitrobenzoic acid was precipitated and recovered.

EXAMPLE III-12

20.0 Grams of a complex product obtained by the same method as adopted in Example I-1 were vigorously agitated twice with 200 g of water heated at 90°C. and thrice with 100 g of water heated at 90°C. When the water layer was removed, 5.50 g of a white solid product (DMN) were obtained. Cooling of the water layer gave 11.2 g of m-nitrobenzoic acid. As a result of the alkali titration analysis, it was found that the m-nitrobenzoic acid content of the resulting DMN product was 1.10 percent by weight.

EXAMPLE III-13

20.0 Grams of a complex product obtained according to the same method as adopted in Example I-1 were contacted in an autoclave with 250 g of water maintained at 120°C., and the water layer was separated from the organic layer.

The above operation was repeated 5 times. Thus, 12.0 g of m-nitrobenzoic acid were recovered from the water layer, and 5.80 g of DMN which contained 0.7 percent by weight of m-nitrobenzoic acid were obtained.

EXAMPLE III-14

To 2.2 g of the complex product obtained in Example II-5, 20 cc of methanol were added and steam heated at 120°C. was passed through the mixture for 15 minutes, whereby 0.4 g of DMN was distilled off together with methanol and steam. The amount recovered of m-nitrobenzoic acid recovered was 1.5 g.

EXAMPLE III-15

To 2.2 g of the complex product obtained in Example II-5, 20 cc of benzene were added and steam heated at 120°C. was passed through the mixture for 15 minutes, whereby 0.65 g of DMN was distilled off together with benzene and steam. The amount of m-nitrobenzoic acid recovered was 1.2 g.

EXAMPLE III-16

To 5.0 g of the complex product obtained in Example II-5, 200 cc of water were added and air heated at 100°C. was passed through the mixture for 1 hour while the mixture was being heated. Thus, 1.5 g of a DMN mixture were obtained.

EXAMPLE III-17

A 300 cc-capacity flask was charged with 4.4 g of the complex product obtained in Example II-5 and a nitrogen gas heated at 100°–110°C. was introduced thereinto while the complex was being heated at the same temperature. The volatilizing DMN was trapped, and 0.8 g of 2,6-DMN and 0.1 g of faintly yellowishly colored DMN comprising 5 percent m-nitrobenzoic acid were obtained.

What we claim is:

1. A process for separating dimethyl naphthalenes having a component comprising 2,6-dimethyl naphthalene in the form of complexes with m-nitrobenzoic acid, which comprises contacting a dimethyl naphthalene isomer mixture comprising at least 2,6-dimethyl naphthalene or a hydrocarbon mixture containing said dimethyl naphthalene isomer mixture with m-nitrobenzoic acid, to thereby form a mixture of complexes of the dimethyl naphthalenes with m-nitrobenzoic acid having a main component comprising a complex of 2,6-dimethyl naphthalene with m-nitrobenzoic acid, and separating the complexes in the solid state from the reaction mixture.

2. The process of claim 1, wherein m-nitrobenzoic acid is used in an amount of 0.1 – 5 moles per mole of 2,6-dimethyl naphthalene contained in the starting dimethyl naphthalene isomer mixture or the starting hydrocarbon mixture containing said dimethyl naphthalene isomer mixture but less than 2 moles per mole of the entire dimethyl naphthalenes contained in the starting mixture.

3. The process of claim 1, wherein the dimethyl naphthalene isomer mixture comprising at least 2,6- dimethyl naphthalene or the hydrocarbon mixture containing said dimethyl naphthalene isomer mixture is contacted in the liquid state with m-nitrobenzoic acid.

4. The process of claim 1, wherein the contact of the dimethyl naphthalene isomer mixture comprising at least 2,6-dimethyl naphthalene or the hydrocarbon mixture containing said dimethyl naphthalene isomer mixture with m-nitrobenzoic acid is conducted while both are kept in the liquid state.

5. The process of claim 1, wherein the contact of the dimethyl naphthalene isomer mixture comprising at least 2,6-dimethyl naphthalene or the hydrocarbon mixture containing said dimethyl naphthalene isomer mixture with m-nitrobenzoic acid is conducted in the presence of a monocyclic aromatic compound of six to nine carbon atoms.

6. The process of claim 2, wherein the dimethyl naphthalene isomer mixture comprising at least 2,6-dimethyl naphthalene or the hydrocarbon mixture containing said dimethyl naphthalene isomer mixture is contacted in the liquid state with m-nitrobenzoic acid.

7. The process of claim 2, wherein the contact of the dimethyl naphthalene isomer mixture comprising at least 2,6-dimethyl naphthalene or the hydrocarbon mixture containing said dimethyl naphthalene isomer mixture with m-nitrobenzoic acid is conducted while both are kept in the liquid state.

8. The process of claim 2, wherein the contact of the dimethyl naphthalene isomer mixture comprising at least 2,6-dimethyl naphthalene or the hydrocarbon mixture containing said dimethyl naphthalene isomer mixture with m-nitrobenzoic acid is conducted in the presence of a monocyclic aromatic compound of six to nine carbon atoms.

9. The process of claim 3, wherein the contact of the dimethyl naphthalene isomer mixture comprising at least 2,6-dimethyl naphthalene or the hydrocarbon mixture containing said dimethyl naphthalene isomer mixture with m-nitrobenzoic acid is conducted in the presence of a monocyclic aromatic compound of six to nine carbon atoms.

10. The process of claim 4, wherein the contact of the dimethyl naphthalene isomer mixture comprising at least 2,6-dimethyl naphthalene or the hydrocarbon mixture containing said dimethyl naphthalene isomer mixture with m-nitrobenzoic acid is conducted in the presence of a monocyclic aromatic compound of six to nine carbon atoms.

* * * * *